US007668871B1

(12) United States Patent
Cai et al.

(10) Patent No.: US 7,668,871 B1
(45) Date of Patent: Feb. 23, 2010

(54) PROVIDING MAPPED USER ACCOUNT INFORMATION TO A STORAGE SERVER

(75) Inventors: Bingxue Cai, San Jose, CA (US); Gyanendra Pradhan, Sunnyvale, CA (US); Wesley R. Witte, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 396 days.

(21) Appl. No.: 11/111,178

(22) Filed: Apr. 20, 2005

(51) Int. Cl.
*G06F 17/30* (2006.01)
(52) U.S. Cl. ........................ 707/200; 717/169; 709/225
(58) Field of Classification Search ................ 707/204, 707/102, 3, 10, 200; 709/225, 223, 245
See application file for complete search history.

(56) References Cited

U.S. PATENT DOCUMENTS

| 6,157,953 | A  | * | 12/2000 | Chang et al. ............... 709/225 |
| 6,463,470 | B1 | * | 10/2002 | Mohaban et al. ............ 709/223 |
| 6,985,905 | B2 | * | 1/2006  | Prompt et al. .............. 707/102 |
| 7,117,504 | B2 | * | 10/2006 | Smith et al. ............... 719/328 |
| 2003/0088656 | A1 | * | 5/2003 | Wahl et al. ................. 709/223 |
| 2004/0054808 | A1 | * | 3/2004 | Ekberg ....................... 709/245 |
| 2006/0155773 | A1 | * | 7/2006 | Drouet et al. ............... 707/200 |

OTHER PUBLICATIONS

User Name Mpping Service in Windows 2000 Services for UNIX, Jan. 5, 2005, Microsoft TechNet, 1-12.*

Amy LaMeyer, the 3rd larg installation system administration of Windows NT conference(On Designing a database for Integrated User Management: Pitfalls and Possibilities), Aug. 1-2, 2000, p. 19-28.*
Tom Lu, Ravi Shankar, AIX 5l LDAP user management, Dec. 27, 2006, p. 1-17.*
User Name Mapping Service in Windows 2000 Services for UNIX, Jan. 5, 2005, Microsoft TechNet, 1-12.*
Mapping LDAP Attributes, IBM, Portal version 5.1, pp. 1-5.*
Daniel Wachdorf, NFSv4 Name mapping in Active Directory, Sep. 26, 2003 pp. 1-4.*
One-to-Many Mapping, Published Aug. 2005, Oracle, pp. 1-2.*
Charlie Russel, Introduction to Microsoft Windows Services for UNIX 3.5, Microsoft TechNet, pp. 1-9.*

* cited by examiner

*Primary Examiner*—John R. Cottingham
*Assistant Examiner*—Sherief Badawi
(74) *Attorney, Agent, or Firm*—Blakely, Sokoloff, Taylor & Zafman LLP (57) ABSTRACT

A method for storage of user mapping data associated with users of data stored by storage servers includes operating multiple storage servers, each configured to provide a set of clients with access to data stored in a set of mass storage devices, and using one or more directory servers, which may be coupled to the storage servers via a network. The directory server stores and provides access to user account information associated with a second operating system based on user account information associated with a first operating system, when the user account information associated with the second operating system is needed to access data stored in accordance with the second operating system.

15 Claims, 9 Drawing Sheets

| | Unix User | Windows NT User |
|---|---|---|
| 1 | gadler | Domain 1\GraceAdler |
| 2 | kwalker | Domain2\KarenWalker |

PROVIDING MAPPED USER ACCOUNT INFORMATION TO A STORAGE SERVER

FIELD OF THE INVENTION

At least one embodiment of the present invention pertains to storage systems, and more particularly, to providing mapped user account information to a storage server.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system may include at least one storage server, which is a processing system configured to store and retrieve data on behalf of one or more storage clients ("clients"). In the context of NAS, a storage server may be a file server, sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Network Appliance, Inc. of Sunnyvale, Calif., makes filers.

In a SAN context, the storage server provides clients with block-level access to stored data, rather than file-level access. Some storage servers are capable of providing clients with both file-level access and block-level access, such as certain Filers made by Network Appliance, Inc.

A business enterprise or other organization that manages large volumes of data may operate multiple storage servers concurrently. These storage servers may be connected to each other through one or more networks. The storage servers and other network components may be managed by one or more network administrators (also called "administrative users" or simply "administrators"), who are responsible for configuring, provisioning and monitoring the storage servers, scheduling backups, troubleshooting problems with the storage servers, performing software upgrades, and so on.

Storage servers retrieve stored data on behalf of one or more clients. When a client requests a storage server to retrieve data stored by the storage server, the storage server typically retrieves the data on behalf of the client as long as the client is determined to have authorization to obtain the requested data based at least in part on client/user identification information. However, since data stored by a storage server may be stored in accordance with one of many available operating systems (OS), such as Windows NT, Unix, DOS, OS X and so on, a client may be denied access to data stored by a storage server in accordance with one OS, if the client provides client/user identification information corresponding to the client's account in a different OS than the one in which the requested data is stored. Thus, for instance, if an otherwise authorized user provides a user ID associated with Unix while attempting to access data stored in accordance with Windows NT, the storage server may erroneously determine the user to be unauthorized.

A common solution to this problem is to map a client's identification information in one OS to the client's identification information in another OS and to use this mapping at the time of the request from the client. Thus, in the example in which a user provides its Unix user identification information to access data stored in accordance with Windows, the user's Unix user identification information is mapped to the user's user identification information in Windows. The user's Windows user identification information is then used to determine if the client is permitted to have access to the data.

Figure 1:
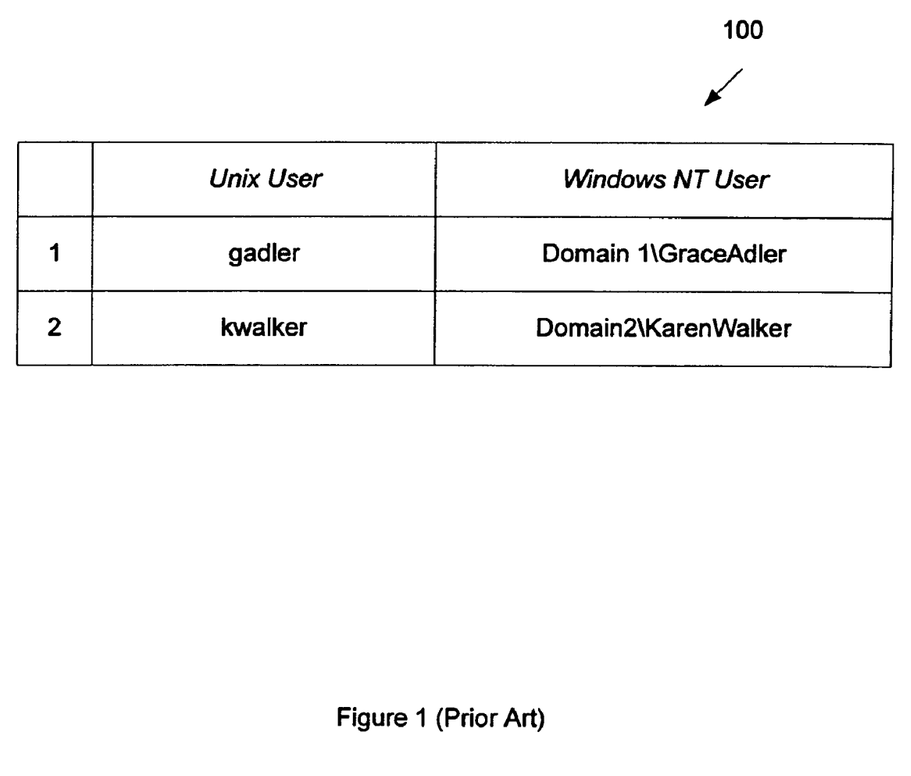
FIG. 1 shows an example of a user mapping file.

Mapping data is generally stored locally on the storage server. FIG. 1 provides an example of user-mapping data being stored in a user mapping file 100. Accordingly, when a storage server requires a user's account identification information in a different OS than the one provided the user, the storage server accesses the locally stored user mapping file 100 to search for the provided identification information and then retrieves the desired account identification information. The user mapping file 100 provides a table with Unix User identifiers (IDs) in one column and the corresponding Windows NT User IDs in a second column.

Localized storage of mapping data is often not desirable in a multiple storage server system context. Localized storage of mapping data often requires that several storage servers store the same data. This requires considerable time and effort not only to input and save the data, but also to update stored data. Often, an administrator must manually change the stored data value on each storage server. Redundant storage of mapping data also means that storage space is being utilized inefficiently. Furthermore, another disadvantage of localized storage of mapping data is that it leads to weaker security. For instance, if an administrator must manually delete a user who is no longer authorized from each storage server, then there is a chance that the unauthorized user can obtain access to data stored by storage servers from which the user has not been removed.

It is desirable, therefore, to provide an improved method and apparatus for storage of user account identification information.

SUMMARY OF THE INVENTION

The present invention includes methods and related apparatus for centralized storage and management of user mapping data. The method includes using a mapping server to provide mapped user account information to the storage server by mapping user account information associated with a first operating system to user account information associated with a second operating system.

In another embodiment, the method includes receiving at a storage server a request from a client to access data stored by the storage server, the request having associated therewith first user account information associated with a first operating system. The requested data is stored by the storage server in accordance with a second operating system. In response to the request, a directory server is accessed from the storage server to obtain second user account information which represents a mapping of the first user account information to a second operating system. The storage server is operated to provide the client with access to the data on the storage server upon receiving the second user account information from the directory server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and an apparatus for centralized storage and management of storage server resource data are described. As described further below, in certain embodiments of the invention, the method includes operating multiple storage servers, each configured to provide a set of clients with access to data stored in a set of mass storage devices, and using at least one directory server, which may be coupled to the storage servers via a network. Further, the method includes operating a mapping server to store and provide user account information associated with an OS, e.g. Windows, when the user's account information associated with a different OS, e.g. Unix is provided.

Figure 2:
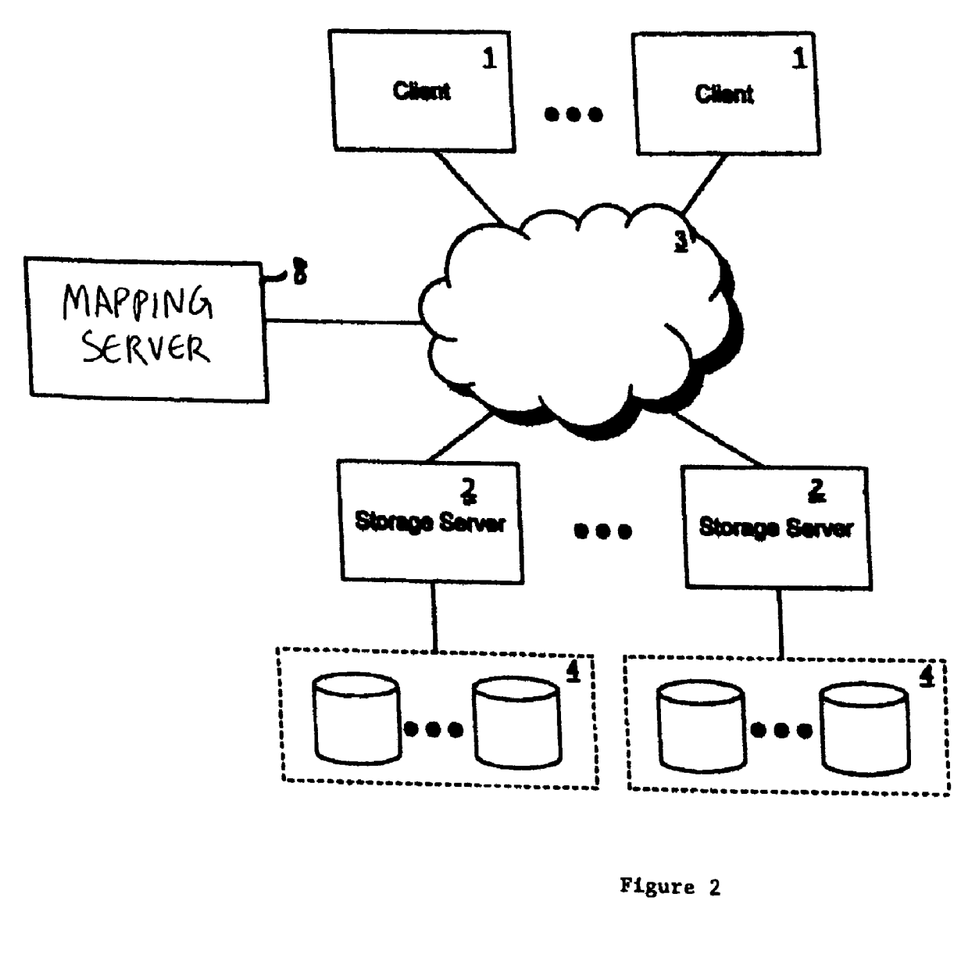
FIG. 2 illustrates a network environment in which the invention can be implemented.

FIG. 2 shows a network environment in which the invention can be implemented. In FIG. 2, a number of storage servers 2 are each coupled locally to a separate storage subsystem 4, each of which includes multiple mass storage devices. Each storage subsystem 4 is managed by its corresponding storage server 2. The storage servers 2 are also coupled through a network 3 to a number of clients 1. Each storage server 2 receives and responds to various read and write requests from the clients 1, directed to data or files stored in or to be stored in the corresponding storage subsystem 4.

Each of the clients 1 may be, for example, a conventional personal computer (PC), workstation, or the like. Each storage server 2 may be, for example, a file server used in a NAS mode (a "storage server 2"), a block-based storage server such as used in a storage area network (SAN), or other type of storage server. The network 3 may be, for example, a local area network (LAN), a wide area network (WAN), a Global Area Network (GAN) such as the Internet, or other type of network or a combination of networks. The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol. Also connected to the network 3 may be a mapping server 8 for storage of resource data associated with storage servers 2.

In one embodiment of the invention, the mapping server 8 is a directory server, such as an LDAP server. The directory server 8 uses a directory service to provide storage and management of storage server resource data. A directory is a specialized database optimized for reading, browsing and searching and tends to contain both descriptive and attribute-based information. Currently, several directory services are known. These include directory services based on OPENLDAP® (Open Lightweight Directory Access Protocol), ACTIVE DIRECTORY® (which is LDAP compliant), NOVELL DIRECTORY SERVICES®, IPLANET®, NETSCAPE DIRECTORY SERVER®, and so on. OPENLDAP®, ACTIVE DIRECTORY®, NOVELL DIRECTORY SERVICES®, IPLANET®, are trademarks of OPENLDAP Foundation, Microsoft Corporation, Novell, Inc., SUN Microsystems, and Netscape-Communications Corporation respectively.

Figure 3:
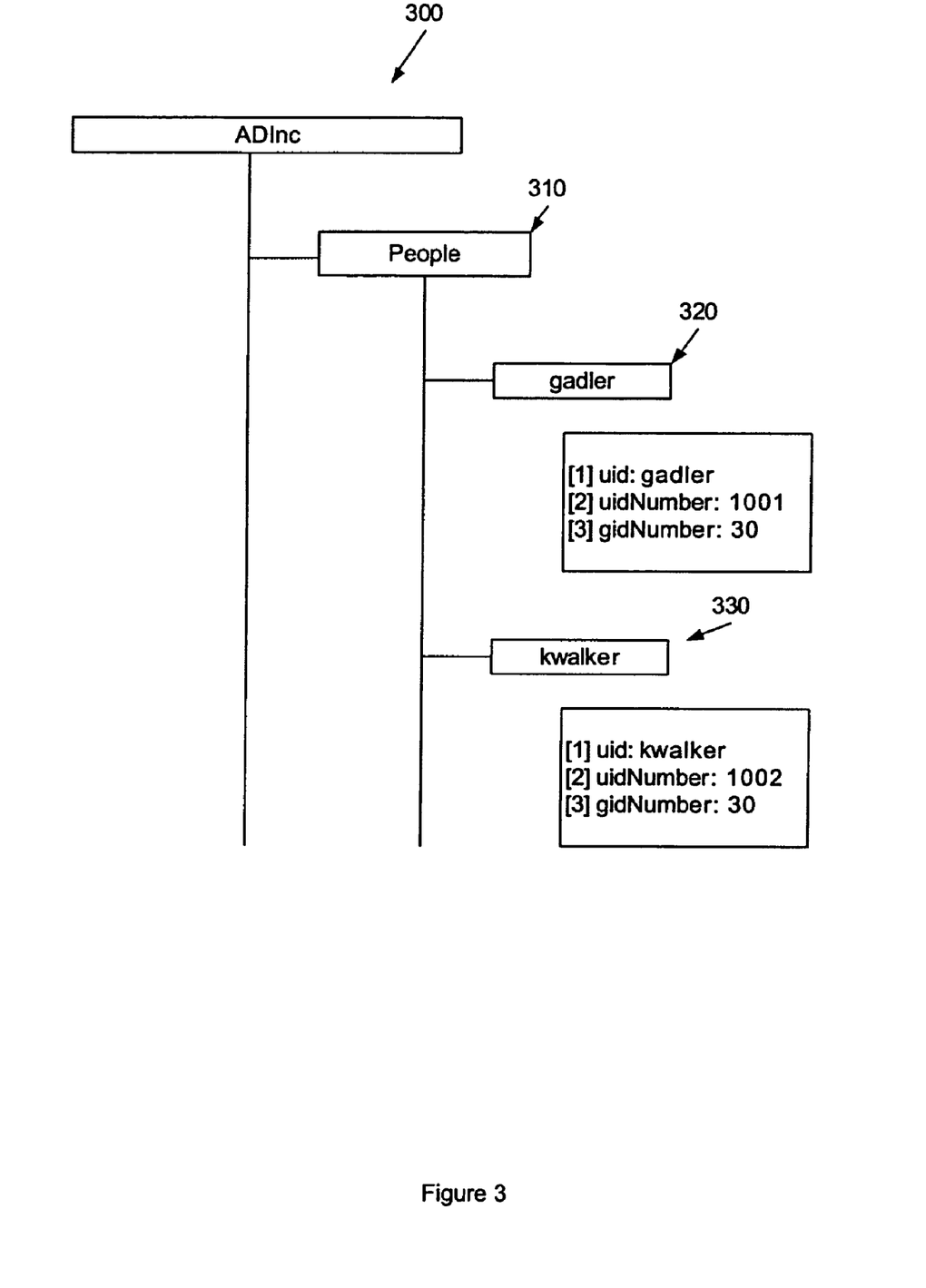
FIG. 3 shows an example of a data format as used in an LDAP directory.

In one embodiment of the invention, the directory server 8 is an LDAP server. Thus, the directory server 8 may be an ACTIVE DIRECTORY®, a Unix LDAP server and so on. FIG. 3 shows an example of a data format as used in a Unix LDAP server 8. In LDAP, directory entries are arranged in a tree-like structure 300. Each entry is a collection of attributes and has a unique name, known as a Distinguished Name (DN). Each attribute has a type and one or more values associated with it. A type is usually a mnemonic string. For instance, the type "o" stands for organization, "ou" stands for organizational unit within the organization, "cn" stands for common name, and so on. As illustrated in FIG. 3, the organization tree "o=ADInc" 300 has a first branch of "ou=People" 310. As the name indicates, this branch contains user data. The branch "ou=People" 310 has several sub-branches 320 and 330, including "cn=gadler" 320, and "cn=kwalker" 330. The sub-branch "cn=gadler" may have several attributes. For instance, Attribute 1 defines gadler's Unix user ID as gadler. Attribute 2 defines gadler's Unix user ID number as 1001. Attribute 3 defines gadler's Unix group ID number as 30. Similarly, for "cn=kwalker" 330, Attribute 1 defines kwalker's Unix user ID as kwalker. Attribute 2 defines kwalker's Unix user ID number as 1002. Attribute 3 defines kwalker's Unix group ID number as 30.

Figure 4:
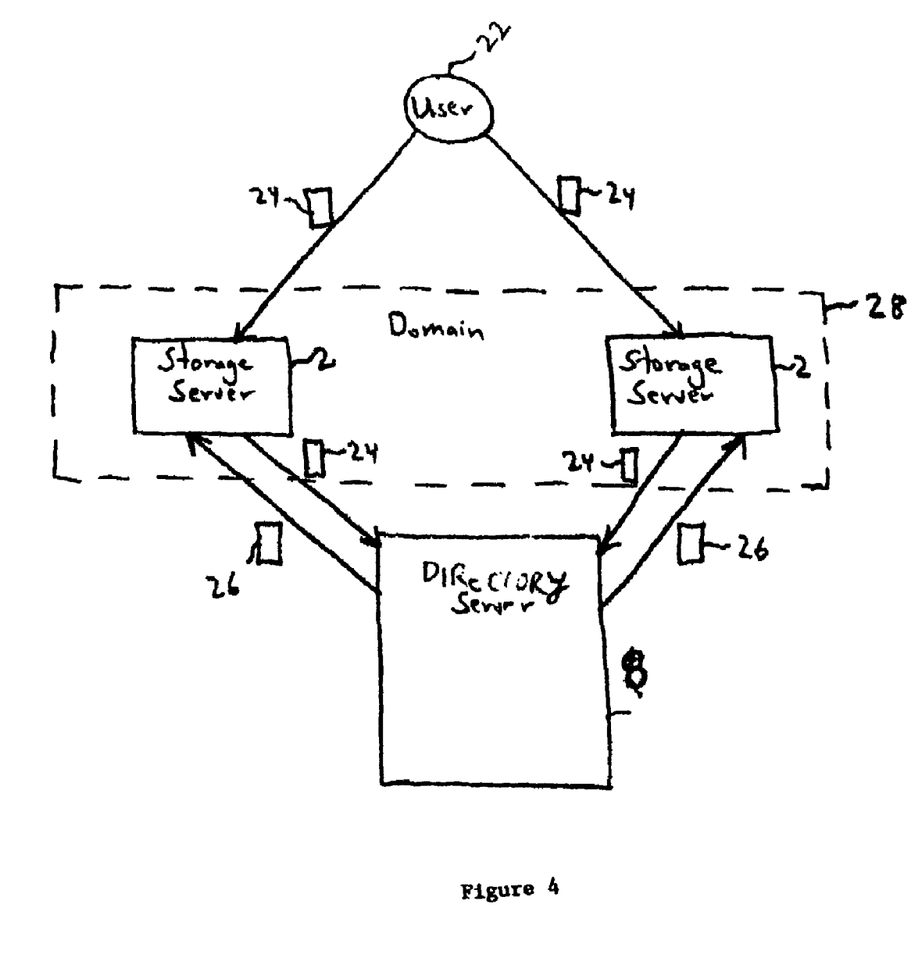
FIG. 4 shows the use of a centralized network directory server to provide resource data to multiple storage servers.

In accordance with certain embodiments of the invention, the directory server 8 is used to store and provide user mapping data to storage servers 2. As illustrated in FIG. 4, a network domain 28 is defined to include a group of storage servers 2 on behalf of which the directory server 8 is to provide centralized storage and management of user mapping data. In one embodiment, an administrator can set up the directory server 8 to contain user mapping data. Any request 24 for user mapping data is sent by a storage server 2 to the directory server 8, with the result 26 returned by the directory server 8 to the storage server 2. In an alternative embodiment of the invention, the directory server 8 is a stand-alone server.

Figure 5:
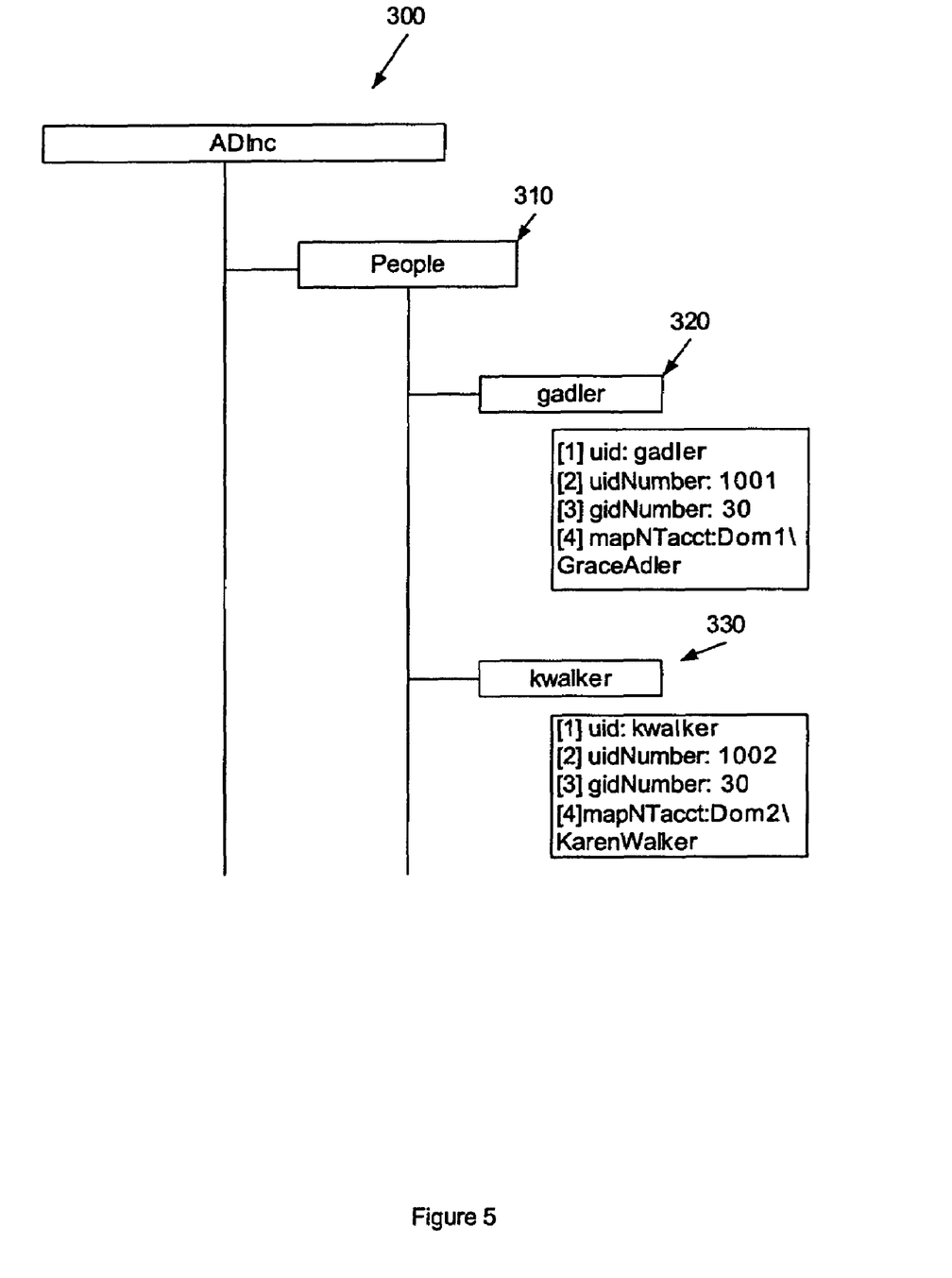
FIG. 5 shows an example of a data format as used in an LDAP directory modified in accordance with one embodiment of the present invention.

In accordance with certain embodiments of the invention, as illustrated in FIG. 5, the mapped user account information may be stored as an additional attribute for each user in the branch of "ou=People" 320 of the organization tree "o=ADInc" 310. For instance, Attribute 4 defines "cn=gadler" 330 mapped Windows NT account information as Dom1\GraceAdler. Similarly, for "cn=kwalker" 340, Attribute 4 defines kwalker's mapped Windows NT account information as Dom2\KarenWalker.

In accordance with certain embodiments of the invention, the schema of a directory server containing user account information is extended to store mapped user account information. In one embodiment of storage systems, it is desirable to extend the schema of the directory to store mapping data in such a way so as to provide for symmetry in mapped data. This embodiment may be known as symmetric user mapping. In symmetric user mapping, if account information corresponding to a first OS maps back to account information corresponding to a second OS, then the account information corresponding to the second OS always maps to account information corresponding to the first OS and vice-a-versa. Thus, for instance, in a storage system configured to provide symmetric lookup of mapping data, if Unix user 'kwalker' maps to windows account 'Dom2\KarenWalker', then the windows account 'Dom2\KarenWalker' always maps to Unix user 'kwalker' and vice-a-versa.

Figure 6A:
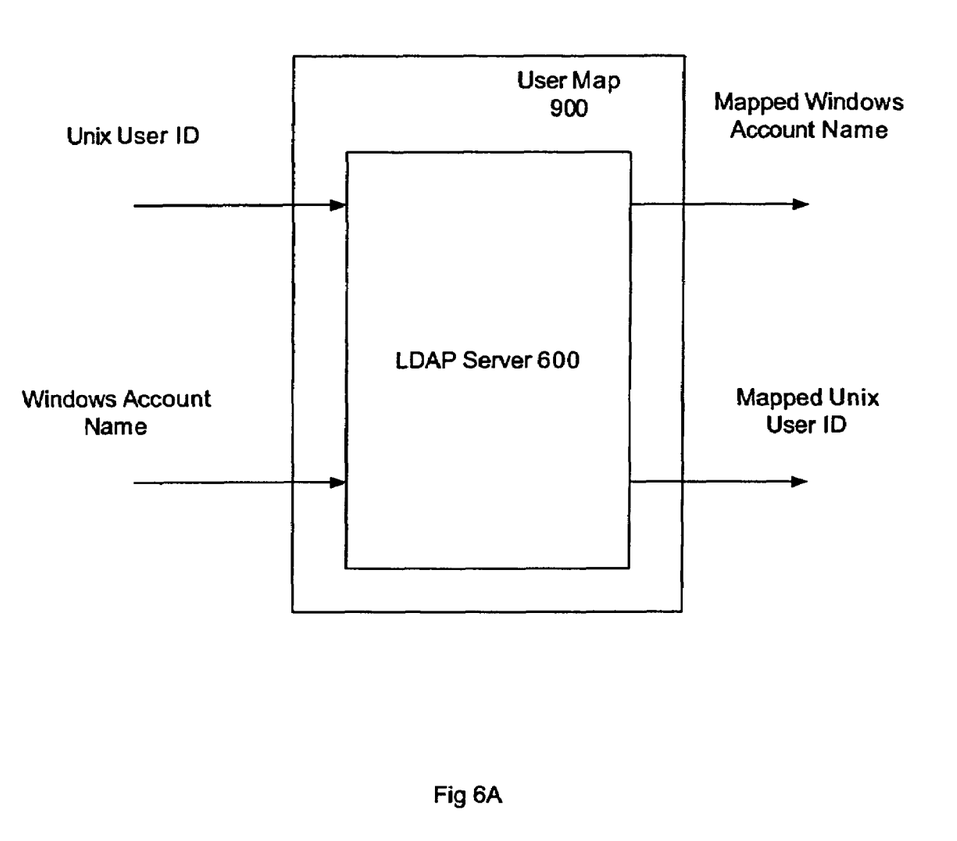
FIG. 6A shows a single directory server providing mapped user account information.

In one embodiment of the invention, symmetric user mapping is implemented using a single directory server. FIG. 6A illustrates an LDAP server 600 mapping a Unix user ID to a user Windows account name and mapping a Windows account name to a Unix user ID based on a user map 900. In one embodiment, the LDAP server 600 is modified by having its schema extended to describe the mapping. Thus, in one embodiment, an attribute that defines the mapped user name is added to the LDAP server 600 as part of a schema extension.

In accordance with certain embodiments of the invention, an LDAP server that saves UNIX user information can be set up as the LDAP server 600 to provide symmetric user mapping using either the option ldap.servers or the option ldap-.preferred.servers. In one embodiment of the invention, the LDAP directory schema is extended to describe the mapping. Accordingly, an attribute can be added to the LDAP directory object as a schema extension. In one embodiment, the option used to achieve this additional attribute is ldap.usermap.attribute.windowsaccount.

Accordingly, in one embodiment, when a storage server 2 requires a Unix user ID to be mapped to a Windows account, the storage server 2 may contact the directory server 600 that saves the Unix user information. In one embodiment, the storage server 2 may use the options ldap.nssmap.objectClass.posixAccount and ldap.nssmap.attribute.uid to search for and identify the Unix user. The storage server 2 may use the option ldap.usermap.attribute.windowsaccount as an LDAP query attribute to retrieve the mapped Windows user name.

Accordingly, in another embodiment of the invention, when a storage server 2 requires a Windows account to be mapped to a Unix user, the storage server 2 may contact the directory server 600 that saves the Unix user information. In one embodiment, the storage server 2 may use the options ldap.nssmap.objectClass.posixAccount and ldap.usermap-.attribute.windowsaccount to find the Unix user ID that is mapped to the requested Windows user name.

In one embodiment, symmetric user mapping provides a simple bi-directional mapping system, in which if 'A' account information corresponding to a first OS maps back to 'B' account information corresponding to a second OS, then 'B' account information corresponding to the second OS always maps to 'A' account information corresponding to the first OS. However, it may be desirable to provide uni-directional or non-symmetric bi-directional mapping, in which if 'A' first account information corresponding to a first OS maps back to 'B' account information corresponding to a second OS, then 'B' account information corresponding to the second OS does not necessarily map to 'A' account information corresponding to the first OS. Instead, 'B' account information corresponding to the second OS may map to 'C' account information corresponding to the first OS.

Figure 6B:
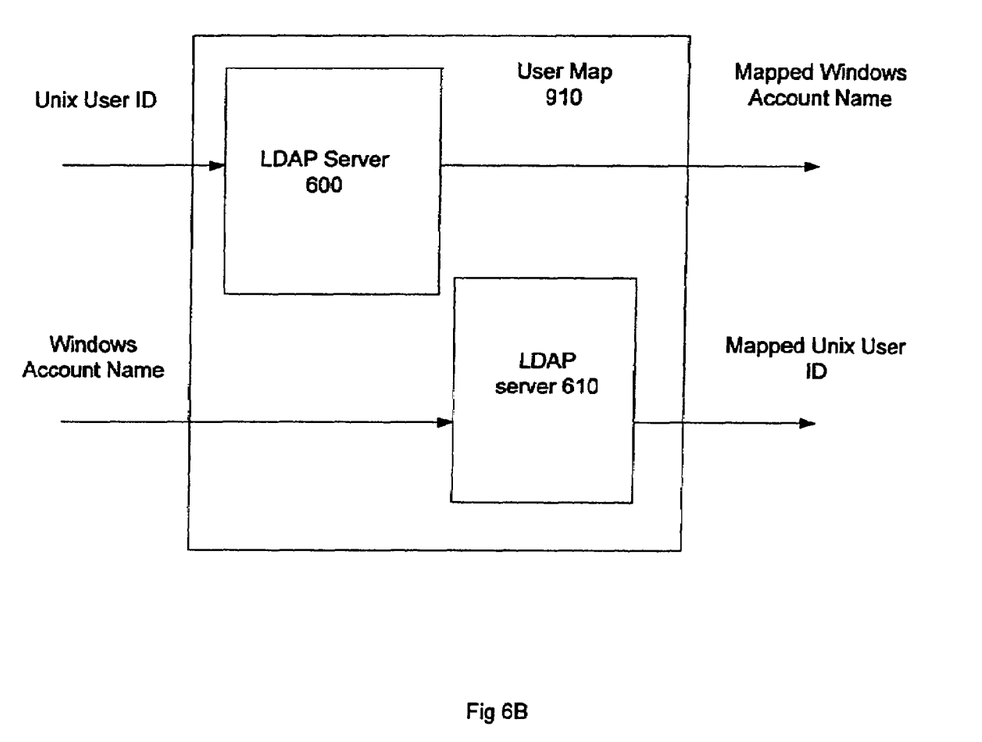
FIG. 6B shows multiple directory servers providing mapped user account information.

In accordance with certain embodiments of the invention, as illustrated in FIG. 6B, a method for asymmetric mapping of user accounts between two different OS is provided based on user map 910. Asymmetric lookup can be implemented in a storage system where it is desirable that if account information corresponding to a first OS maps to account information corresponding to a second OS, then the account information corresponding to the second OS does not necessarily map to account information corresponding to the first OS.

According to one embodiment of this invention, providing asymmetric mapping involves operating multiple directory servers. In one embodiment, at least a first directory server saves user information associated with a first OS, e.g. Unix, and at least a second directory server saves user information associated with the second OS, e.g. Windows. In one embodiment of the invention, the directory schema of both directory servers is extended to describe the mapping. Accordingly, an attribute that defines the mapped user name is added to the directory objects as a schema extension. In one embodiment, the option used to achieve this additional attribute is ldap.usermap.attribute.windowsaccount and ldap.usermap.attribute.Unixaccount respectively.

Accordingly, in one embodiment, when a storage server 2 requires a Unix user ID to be mapped to a Windows account, the storage server 2 may contact the directory server 600 that saves the Unix user information. In one embodiment, the storage server 2 may use the options ldap.nssmap.objectClass.posixAccount and ldap.nssmap.attribute.uid to search for and identify the Unix user. The storage server 2 may use the option ldap.usermap.attribute.windowsaccount as an LDAP query attribute to retrieve the mapped Windows user name.

In another embodiment of the invention, when a storage server 2 requires a Windows account to be mapped to a Unix user, the storage server 2 may contact the directory server 610 that saves the Windows user information. In one embodiment, the directory server 610 is an ACTIVE DIRECTORY®. In one embodiment, the storage server 2 may use the options ldap.usermap.windows-to-unix.objectClas and ldap.userma-p.attribute.unixaccount to find the Unix user ID that is mapped to the requested Windows user name.

In one embodiment of the invention, directory server 610 that provides mapped Windows account information based on an input of Unix User IDs can be implemented using a schema extension in the same way as the LDAP directory 600 is implemented in the case of symmetrical mapping above. Accordingly, a storage system that provides asymmetrical mapping represents an extension of a storage system that provides symmetrical mapping. This embodiment is further advantageous in that mapping from Unix user ID to Windows account may be implemented in the same way as it is in the case of symmetric mapping.

Figure 7:
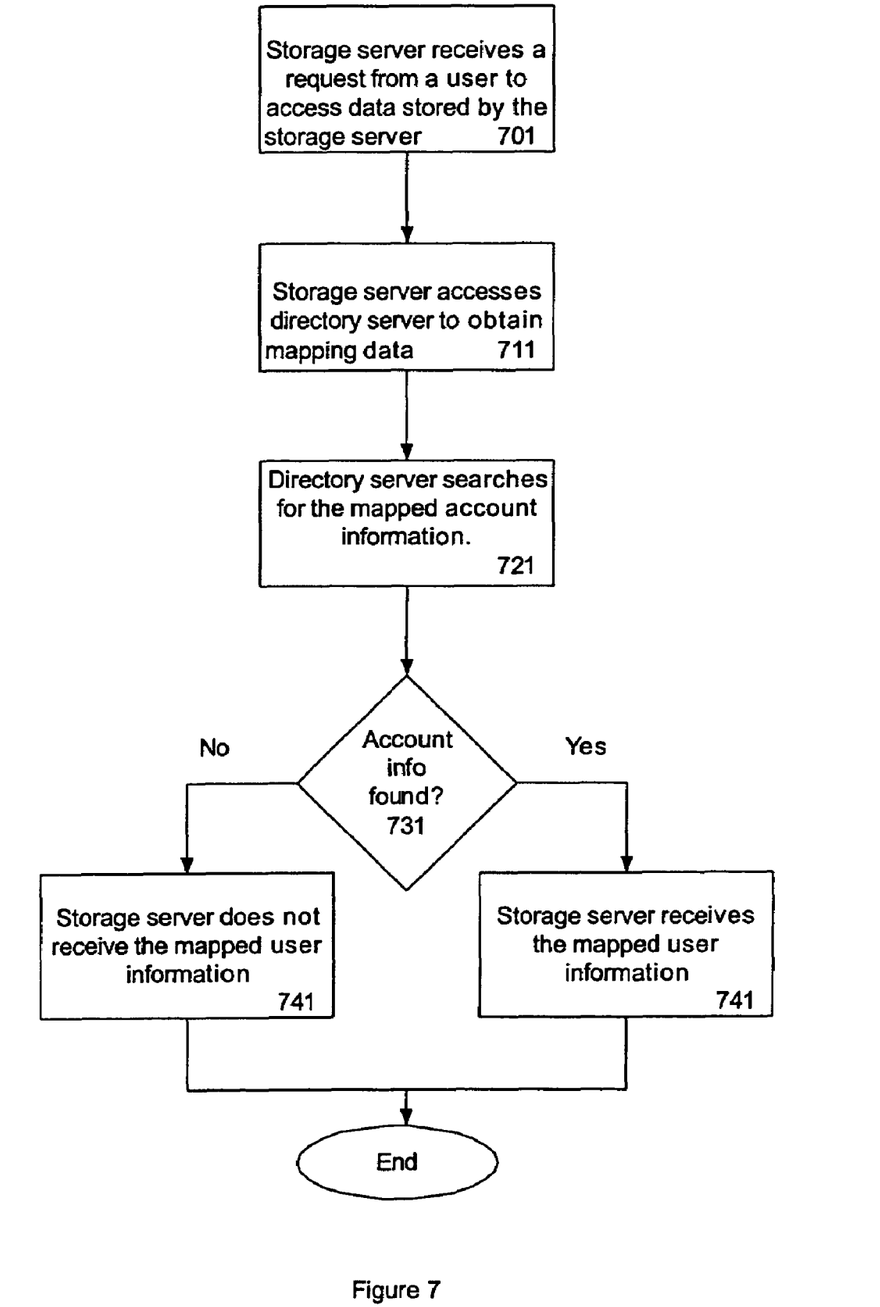
FIG. 7 is a flow diagram showing a process performed by a storage server to obtain mapped user account information.

FIG. 7 is a flow diagram showing a process performed by a storage server to obtain mapped user name 'B' from a request that contains the user name 'A'. At block 701, a storage server 2 receives a request from a client 1 to access data stored by the storage server 2, such as a read or write request. In one embodiment, an attempt by the storage server 2 to retrieve the data requested by the client 1 using the user name 'A' is unsuccessful because user name 'A' is not recognized by the OS used to store the requested data. In order for proceed with the read/write operation, the storage server 2 finds the needs to map the supplied user name 'A' to a user name which the OS recognizes.

At block 711, the storage server 2 responds to the request, or to an unsuccessful attempt to locate the user name 'B' locally, by connecting to the appropriate directory server 600. In the case where the storage server 2 requires a Unix user ID 'A', when supplied with a Windows User name 'B', the storage server 2 connects with LDAP server 600 that stores Unix user information along with the mapped Windows user name. In the case where the storage server 2 requires a Windows User name 'A', when supplied with a Unix user ID 'B', the storage server 2 connects with LDAP server 600 in case of symmetric user mapping and LDAP server 610 in case of asymmetric user mapping.

At block 721, the directory server searches for the user information according to the supplied user ID 'A'. In one embodiment, the options are set as follows for the storage server 2 to map a Unix user ID 'A' to a Windows User name 'B':

| | |
|---|---|
| LDAP search base is set to | cn = Users, dc=domain0 |
| LDAP search scope is set to | BASE |
| LDAP search filter is set to | (&(objectClass=PosixAccount) (uid = unixuserid) |
| LDAP retrieve attribute is set to | mapped NTUserName |

In one embodiment, the options are set as follows for the storage server 2 to symmetrically map a Windows user account 'A' to a Unix user ID 'B':

| | |
|---|---|
| LDAP search base is set to | cn = Users, dc=domain0 |
| LDAP search scope is set to | BASE |
| LDAP search filter is set to | (&(objectClass=PosixAccount) (mappedNTusername=domain1\ntuser) |
| LDAP retrieve attribute is set to | uid |

In another embodiment, the options are set as follows for the storage server 2 to asymmetrically map a Windows user account 'A' to a Unix user ID 'B'. LDAP search base is automatically set according to the domains that the request Windows user belongs to. For instance, if the windows user is: domain1\ntuser1, then the search base will be set to "dc=domain1". Similarly, if the windows user is: domain2\ntuser2, the search base will be set to "dc=domain2".

| | |
|---|---|
| LDAP search scope is set to | SUBTREE |
| LDAP search filter is set to | (&(objectClass=User) (sAMAccountName=domain1\ntuser1) |
| LDAP retrieve attribute is set to | mappedUNIXUserID |

At block 731, if the directory server successfully retrieves the LDAP record containing the supplied user ID, it searches the record for the attribute containing the mapped account information. The directory server provides the found mapped account name to the storage server 2 at block 741. In one embodiment, upon receiving the mapped account information, the storage server 2 may validate the mapped account in the corresponding user database. For example, if the mapped account 'B' is a Windows account, the storage server 2 may query the Local Security Authority (LSA) of the domain of the Windows account for the existence of the obtained mapped Windows account. If the LSA query succeeds, the user mapping from Unix user ID 'A' to Windows account 'B' is determined to be valid. If the mapped account 'B' is a Unix account, the storage server 2 may query the UNIX LDAP server 600 for the existence of the mapped UNIX account. If the query succeeds, the user mapping from Windows account 'A' to UNIX user 'B' is determined to be valid.

If, however, at block 731, the directory server is unsuccessful in retrieving the record containing the supplied user ID, it cannot provide the mapped account information to the storage server 2 at block 741. This may mean that the storage server 2 cannot find mapped user name 'B' from a request that contains the user name 'A'. The failure may be caused by various reasons. For instance, the user may have been deleted because it is no longer an authorized user, or the mapped user account may have been deleted because the mapped user is no longer an authorized user.

In one embodiment of the invention, the directory server may provide an error message to the storage server 2. Accordingly, the LDAP server 600 may provide a message to the storage server 2 with a message that the Unix user entry associated with the supplied Unix user ID 'A' was deleted from the LDAP server 600. Alternatively, the LDAP server 600 may provide a message to the storage server 2 that the mapped Windows user entry 'B' was deleted from the LDAP server 600 in the case of symmetric mapping. The LDAP server 610 may provide a message to the storage server 2 that the mapped Windows user entry 'B' was deleted from the LDAP server 610 in the case of asymmetric mapping.

Figure 8:
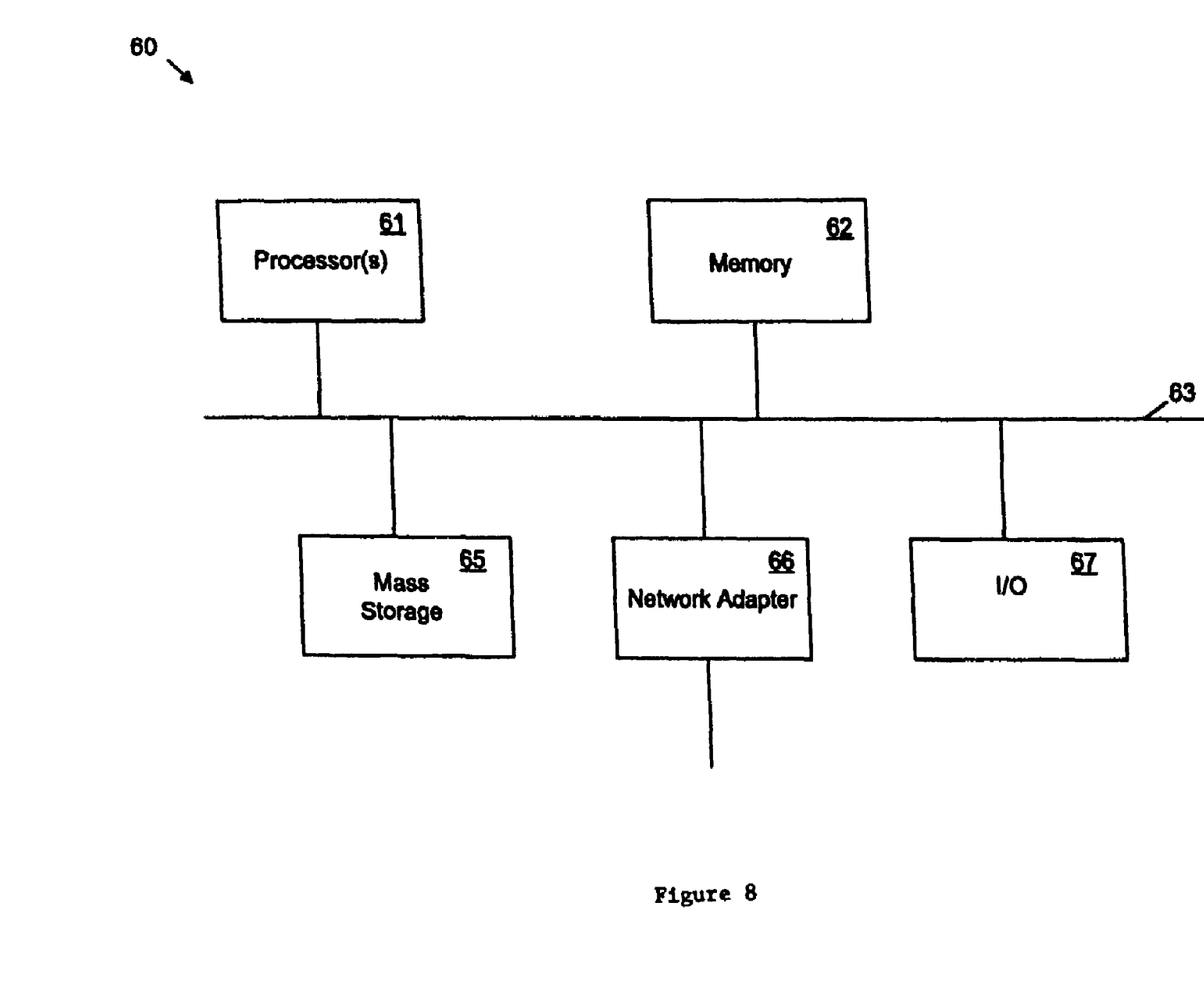
FIG. 8 is a high-level block diagram of a processing system.

As indicated above, the techniques introduced herein can be implemented in software, either in whole or in part. FIG. 8 is a high-level block diagram showing an example of the architecture of a processing system, at a high level, in which such software can be embodied. The illustrated processing system 60 can represent a storage server, a directory server, a client, or other form of processing system. Note that certain standard and well-known components which are not germane to the present invention are not shown.

The processing system 60 includes one or more processors 61 and memory 62, coupled to a bus system 63. The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

The bus system 63 shown in FIG. 8 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., clients 1) over a network and may be, for example, an Ethernet adapter, a Fibre Channel adapter, or the like. The processing system 60 may also include one or more input/output (I/O) devices 67 coupled to the bus system 63. The I/O devices 67 may include, for example, a display device, a keyboard, a mouse, etc. If the processing system 60 is a storage server 2, it may include a storage adapter (not shown), such as a Fibre Channel adapter or a SCSI adapter, to allow the storage server 2 to access a set of mass storage devices.

Thus, a method and apparatus for centralized storage and management of storage server resource data have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    operating a first Lightweight Directory Access Protocol (LDAP) directory server and a second LDAP directory server which communicate with a storage server through a network;
    extending an LDAP directory schema of the first LDAP directory server and the second LDAP directory server to store, at the first LDAP directory server, a first mapping of user account information from a first operating system to a second operating system, and to store, at the second LDAP directory server, a second mapping of the user account information from the second operating system to the first operating system, wherein each of the first and second LDAP directory serves retrieving the first and second mappings by searching LDAP records using user IDs, and by automatically limiting searches of the LDAP records for the user account information within a domain to which the user belongs, the domain being a subtree of a directory tree;
    in response to a first request from the storage server to map a Unix user's ID to a Windows account, searching for and identifying the Unix user by the first LDAP directory server with ldap.nssmap.objectClass.posixAccount and ldap.nssmap.attribute.uid, retrieving the Windows account with ldap.usermap.attribute.windowsaccount as an LDAP query attribute, and returning the Windows account, to the storage server; and
    in response to a second request from the storage server to map the Windows account to the Unix user, determining an identifier of the Unix user by the second LDAP directory server with ldap.usermap.windows-to-unix.objectClass and ldap.usermap.attribute.unixaccount, and returning the identifier of the Unix user, to the storage server,
    wherein the identifier of the Unix user determined in response to the second request is different from the Unix user's ID in the first request.

2. The method as recited in claim 1, wherein the second account information associated with the second operating system is used to provide a user with access to data stored by the storage server in accordance with the second operating system.

3. The method as recited in claim 1, wherein the second account information associated with the second operating system is stored as an attribute in an entry of a user account associated with the first operating system in the first LDAP directory server.

4. The method as recited in claim 3, wherein the attribute containing the second account information associated with the second operating system is created via a directory schema extension.

5. The method as recited in claim 1, wherein the first LDAP directory server maps the first account information associated with the first operating system to the second account information associated with the second operation system in response to a determination that a user initiating the request is a valid user based on the first account information associated with the first operating system.

6. The method as recited in claim 1, further comprising:
    using the second LDAP directory server to map the second account information associated with the second operating system to the first account information associated with the first operating system.

7. The method as recited in claim 1, wherein the second directory server is an active directory.

8. The method as recited in claim 1, wherein the first operating system is a Unix operating system and the second operating system is a Windows based operating system.

9. A method comprising:
    accessing, from a storage server, a first Lightweight Directory Access Protocol (LDAP) directory server that stores a first mapping of user account information from a first operating system to a second operating system and a second LDAP directory server that stores a second mapping of the user account information from the second operating system to the first operating system, wherein each of the first and second LDAP directory servers retrieving the first and second mappings by searching LDAP records using user identifiers, and by automatically limiting searches of the LDAP records for the user account information within a domain to which the user belongs, the domain being a subtree of a directory tree;
    in response to a first request from a first client, the storage server accessing the first LDAP directory server to map a Unix user's ID to a Windows account, wherein the first LDAP directory server searches for and identifies the Unix user with ldap.nssmap.objectClass.posix.Account and ldap.nssmap.attribute.uid, retrieves the Windows account with ldap.usermap.attribute.windowsaccount as an LDAP query attribute, and returns the Windows account to the storage server; and
    in response to a second request from a second client, the storage server accessing the second LDAP directory server to map the Windows account to the Unix user, wherein the second LDAP directory server determines an identifier of the Unix user with lap.usermap.windows-to-unix.objectClass and ldap.usermap.attribute.unixaccount, and returns the identifier of the Unix user to the storage server,
    wherein the identifier of the Unix user determined in response to the second request is different from the Unix user's ID in the first request; and
    operating the storage server to provide the first client and the second client with access to data on the storage server upon the storage server receiving the user account information from the first LDAP directory server and the second LDAP directory server.

10. The method as recited in claim 9, wherein the second account information associated with the second operating system is stored as an attribute in an entry of a user account associated with the first operating system in the first LDAP directory server.

11. The method as recited in claim 9, wherein the storage server receives the second account information associated with the second operating system in response to a determination that a user initiating the request is a valid user based on the first account information associated with the first operating system.

12. A storage server comprising:
- a processor;
- a storage adapter through which to communicate with a set of mass storage devices;
- a network adapter through which to communicate with a client; and
- a memory containing instructions to cause the processor to:
- receive at the storage server a request by a client for access to data stored by the storage server, the request including a first set of user account information of a user associated with a first operating system;
- access a first Lightweight Directory Access Protocol (LDAP) directory server that stores a first mapping of user account information from a first operating system to a second operating system and a second LDAP directory server that stores a second mapping from the second operating system to the first operating system,
- wherein each of the first and second LDAP directory servers retrieving the first and second mappings by searching LDAP records using user identifiers, and by automatically limiting searches of the LDAP records for the user account information within a domain to which the user belongs, the domain being a subtree of a directory tree representing the first mapping or the second mapping;
- in response to a first request, access the first LDAP directory server to map a Unix user's ID to a Windows account, wherein the first LDAP directory server searches for and identifies the Unix user with ldap.nssmap.objectClass.posix.Account and ldap.nssmap.attribute.uid, retrieves the Windows account with the ldap.usermap.attribute.windowsaccount as an LDAP query attribute, and returns the Windows account to the storage server;
- in response to a second request, access the second LDAP directory server to map the Windows account to the Unix user, wherein the second LDAP directory server determines an identifier of the Unix user with the ldap.usermap.windows-to-unix.objectClass and ldap.usermap.attribute.unixaccount, and returns the identifier of the Unix user to the storage server,
- wherein the identifier of the Unix user determined in response to the second request is different from the Unix user's ID in the first request; and
- receive at the storage server user account information.

13. The storage server as recited in claim 12, wherein the data is stored by the storage server in accordance with the second operating system.

14. The storage server as recited in claim 12, wherein the second set of user account information associated with the second operating system is stored as an attribute in an entry of a user account associated with the first operating system in the first LDAP server.

15. The storage server as recited in claim 12, further comprising validating the second set of user account information associated with the second operating system.

* * * * *